US010223724B1

United States Patent
Lavin

(10) Patent No.: US 10,223,724 B1
(45) Date of Patent: Mar. 5, 2019

(54) SYSTEM FOR CUSTOMIZING KEEPSAKE CLOTHING

(71) Applicant: John Lavin, Bronx, NY (US)

(72) Inventor: John Lavin, Bronx, NY (US)

( * ) Notice: Subject to any disclaimer, the term of this patent is extended or adjusted under 35 U.S.C. 154(b) by 424 days.

(21) Appl. No.: 15/193,737

(22) Filed: Jun. 27, 2016

Related U.S. Application Data

(63) Continuation-in-part of application No. 14/624,768, filed on Feb. 18, 2015, which is a continuation-in-part of application No. 13/314,333, filed on Dec. 8, 2011.

(60) Provisional application No. 61/421,433, filed on Dec. 9, 2010.

(51) Int. Cl.
*G06Q 30/06* (2012.01)
*G06Q 30/04* (2012.01)
*H04N 1/54* (2006.01)

(52) U.S. Cl.
CPC ......... *G06Q 30/0621* (2013.01); *G06Q 30/04* (2013.01); *H04N 1/54* (2013.01)

(58) Field of Classification Search
CPC .................................................. G06Q 30/0621
See application file for complete search history.

(56) References Cited

U.S. PATENT DOCUMENTS

| 7,216,092 B1 | 5/2007 | Weber et al. |
| 7,457,682 B1 | 11/2008 | Varnell |
| 9,141,959 B2 | 9/2015 | Auld et al. |
| 2002/0025085 A1 | 2/2002 | Gustafson et al. |
| 2002/0108189 A1 | 8/2002 | Kahl |
| 2003/0191694 A1* | 10/2003 | Vonfeldt ................. G06F 21/10 705/26.1 |
| 2005/0177453 A1 | 8/2005 | Anton et al. |
| 2005/0240416 A1 | 10/2005 | Schindler et al. |
| 2005/0289018 A1 | 12/2005 | Sullivan et al. |
| 2006/0053061 A1 | 3/2006 | Evans |
| 2006/0111976 A1 | 5/2006 | Pompushko |
| 2007/0038716 A1 | 2/2007 | Saguy |
| 2007/0288395 A1 | 12/2007 | Maggio |
| 2008/0222560 A1 | 9/2008 | Harrison |

(Continued)

OTHER PUBLICATIONS

"Custom Printed Shirts With Team Rosters"; Mar. 28, 2012; from the website transferexpress.com (Year: 2012).*

(Continued)

*Primary Examiner* — Kira Nguyen
(74) *Attorney, Agent, or Firm* — Werschulz Patent Law, LLC; Patricia P. Werschulz, Esq.

(57) ABSTRACT

A system for customizing clothing that memorializes an event, an association or a fantasy team by electronically collecting messages and signatures to be arranged and printed on clothing. In one embodiment, a user desiring to memorialize an event creates a list of invitees to whom the system sends an electronic invitation to create a signature and a message to be printed on a shirt. In another embodiment, a user desiring a celebrity signature submits a bid for said signature. In another embodiment, a user presents a fantasy team roster and signatures of the team players are placed on an article of clothing. An invitee or celebrity electronically submits the signature and message to the system through a pointing device. The system provides a plurality of tools and templates to lay out the submissions in an individualized graphic design for printing on keepsake clothing.

18 Claims, 17 Drawing Sheets

(56) References Cited

U.S. PATENT DOCUMENTS

| | | |
|---|---|---|
| 2009/0112680 A1 | 4/2009 | Dovrath et al. |
| 2009/0113595 A1* | 5/2009 | Hooks, Jr. ............... A41D 27/08 2/69 |
| 2009/0234753 A1 | 9/2009 | Shi |
| 2010/0162137 A1 | 6/2010 | Ganz et al. |
| 2010/0211805 A1 | 8/2010 | Berg et al. |
| 2011/0099089 A1 | 4/2011 | Wolfram |
| 2011/0294473 A1 | 12/2011 | Subburam |
| 2013/0138967 A1 | 5/2013 | Auld et al. |
| 2014/0036302 A1* | 2/2014 | Goldberg ............. G06F 17/214 358/1.15 |

OTHER PUBLICATIONS

Anonymous, Signature Shirts on graduationshirts.com http://web.archive.org/web/20060610214053/http://graduationshirts.com/.

* cited by examiner

SYSTEM FOR CUSTOMIZING KEEPSAKE CLOTHING

CROSS-REFERENCE TO RELATED APPLICATIONS

This application is a continuation-in-part of the nonprovisional utility application and claims the priority thereof, Ser. No. 14/624,768, filed in the United States Patent and Trademark Office on Feb. 18, 2015, which is a continuation-in-part and claims the priority thereof, Ser. No. 13/314,333, filed in the United States Patent and Trademark Office on Dec. 8, 2011, which is the nonprovisional utility application of the provisional patent application, Ser. No. 61/421,433, filed in the United States Patent Office on Dec. 9, 2010, and claims the priority thereof and is expressly incorporated herein by reference in its entirety.

TECHNICAL FIELD

The present disclosure relates generally to a system for customizing clothing with individualized graphic designs. More particularly, the present disclosure relates to a system for customizing clothing that memorializes an event, an association, a team, a personalized message from a celebrity or a celebrity autograph by electronically collecting messages and signatures to be arranged and printed as an individualized graphic design on an article of clothing as a keepsake souvenir of the event or association.

BACKGROUND

For generations, people have created keepsakes of important events and associations in their lives. Yearbooks, scrapbooks, programs and autograph books have been used to create memorabilia of these events or associations. Classmates sign yearbooks, especially at graduation ceremonies, adding special messages. Teammates sign programs at the end of the season. Sometimes a general-purpose autograph book or scrapbook is used at a time of a party or milestone event to record who is present or capture a celebrity autograph.

As yearbooks become electronic records on compact disks and programs are replaced by websites, the desire to collect messages and signatures of friends and special people, such as celebrities, remains. Many have transformed an article of clothing into a canvas for special messages and autographs from friends. Particularly popular choices are caps and tee shirts. Signing tee shirts, especially for an event such as the last day of school or graduation, has become especially popular. There is even a Facebook® page entitled, "i love signing t-shirts the last day of school!!"

Although creating a note or a drawing and signing an article of clothing is currently in vogue, many of the irritating problems that vexed old school yearbook autograph hounds continue with signing of tee shirts and other items of clothing. For example, one friend may sign with the wrong type of pen that smears or bleeds into another's message. Alternatively, they may use ink that washes out during the first laundering. An acquaintance may write something inappropriate that is embarrassing or obscene that cannot easily be removed or obliterated. Another friend may write in letters too large, taking up too much space and crowding out others. Close friends or special teachers may be absent on the day of signing. These circumstances spoil the joy of the occasion, just as they did when people signed books.

In addition to creating wearable memorabilia for special occasions, customized garments can be created for hobbies and recreational interests. Fantasy sports are a popular pastime, wherein participants create dream teams to compete against other's dream teams. Fantasy sports began with baseball, a statistic laden endeavor. Fantasy sports leagues have expanded from baseball into every professional team sport, such as football, soccer, hockey, and rugby. In particular, fantasy football has a large level of participation with over 57 million competitors. The ubiquity of computing devices and access to the Internet has allowed this form of entertainment to explode. Participants form a league and enter their picks into a website that then gathers player statistics after each real game to almost instantly calculate scores in the fantasy league, allowing the participants to track standing in their league, make trades, adjust rosters, cut players and sign players within the pool of real players in their fantasy league.

Many have proposed systems for creating customized articles of clothing and merchandise using customized graphics. One has suggested a system to store an edited customized design so that user can repeatedly order customized products, without reentering the design for each order. These products generally are stationery and other printed matter. Another system allows the user to engage different vendors using the same design, depending on the vendor's capabilities and product line. Others have adopted a similar system where a user selects design elements from a limited number of graphical designs provided by the system and creates a layout that is stored so that user can repeatedly order customized products, without reentering the layout for each order. Other systems allow a user to select several custom designs and then notify others that the items are available for order. All of these systems only allow input on the design graphics and layout from one user who is either designing for only himself or herself or for a group who has no input in the design. All elements of the customized design for placement on merchandise are provided from within the system or by a single user.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

It is an object of this disclosure to provide a system for customizing keepsake clothing that allows a user to select and invite from a group selected among friends, relatives and associates to sign and write a message on an article of clothing. Accordingly, the system for customizing keepsake clothing allows the user to create a list of invitees with associated electronic addresses and send invitations to sign and write a message on the article of clothing.

It is a further object of this disclosure to provide a system for customizing keepsake clothing that allows a user to bid on signature of a celebrity. Accordingly, the system provides a bidding process for a user for selecting a celebrity, requesting a personalized message with specific content, requesting the size, shape, style and color of the garment along with placement of the message on the garment along with a bid.

It is yet a further object of this disclosure to provide a system for customizing keepsake clothing that allows a signer to easily enter a signature and a personalized message. Accordingly, the system provides a means of signing and creating a personalized message through a pointing device such as a stylus, mouse or finger connecting to a server that controls printing the signature and personalized message on the keepsake clothing.

It is another object of this disclosure to provide a system for customizing keepsake clothing that allows a user to electronically collect signatures and messages from invitees. Accordingly, the system for customizing keepsake clothing collects a plurality of submissions of signatures and messages from invitees and stores the submissions for the user.

It is a further object of this disclosure to provide a system for customizing keepsake clothing that allows a user to electronically track the collection of signatures and messages from invitees. Accordingly, the system for customizing keepsake clothing tracks the submissions of signatures and messages from invitees and associates a submission with an invitee and provides an updated status of who has responded to the user and selectively sends reminders to unresponsive invitees.

It is yet another object of this disclosure to provide a system for customizing keepsake clothing that allows a user to arrange signatures and messages on an article of keepsake clothing according to a desired layout and appearance. Accordingly, the system for customizing keepsake clothing allows the user to arrange, modify the size and placement of signatures and messages provided by invitees or celebrities creating the desired layout and appearance in an individualized graphic design for the keepsake clothing.

The disclosure describes a system for customizing clothing that memorializes an event, an association or a fantasy team by electronically collecting messages and signatures from a plurality of signers to be arranged and printed on an article of clothing as a keepsake souvenir of the event or association. In one embodiment, a user desiring to memorialize an event such as a graduation creates a list of invitees to whom the system sends an electronic invitation to create a submission of a signature and a message to be printed on an article of clothing such as a tee shirt. In another embodiment, a user desiring a celebrity signature submits a bid for said signature. In another embodiment, a user presents a fantasy team roster and signatures of the team players are placed on an article of clothing. An invitee or celebrity electronically submits the signature and message to the system through a pointing device. The system collects, stores and tracks the responses or bids until the auction, collection or roster is complete. The system provides a plurality of tools and templates to lay out the submissions in an individualized graphic design for printing on keepsake clothing.

To the accomplishment of the above, this disclosure may be embodied in the form illustrated in the accompanying drawings. Attention is called to the fact, however, that the drawings are illustrative only. Variations are contemplated as being part of the disclosure.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
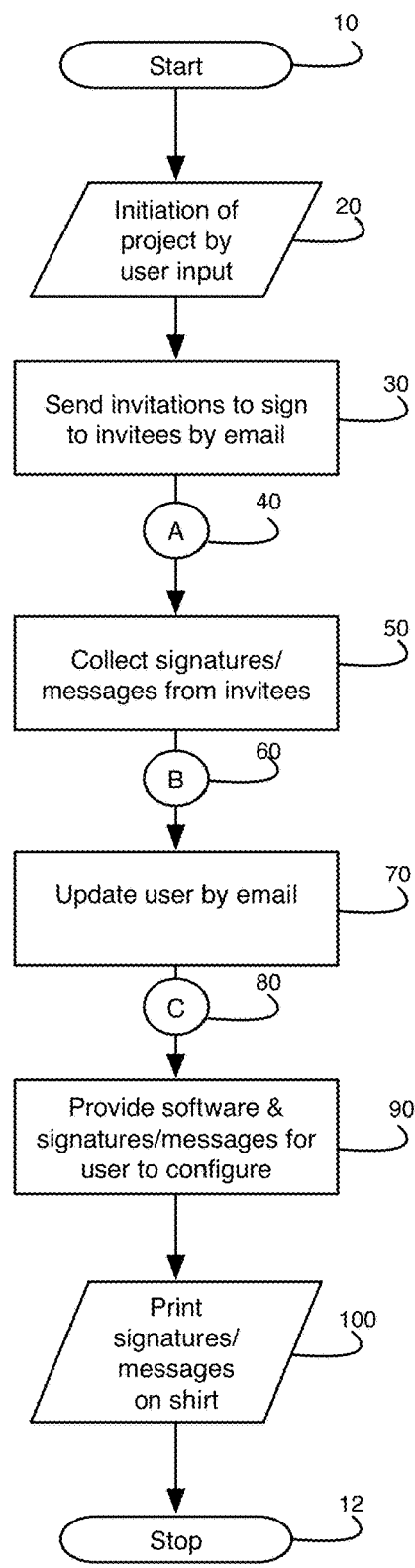
FIG. 1 is a flow diagram showing an overview of a system for customizing an article of keepsake clothing.

FIG. 1 illustrates a flow chart showing an overview of a system of a plurality of software applications, at least one server and at least one personal computing device for customizing an article of keepsake clothing. A user desires a customized article of keepsake clothing that memorializes an event or an association by collecting messages and signatures that are printed on the customized clothing. As a non-limiting example, a user desires to have a keepsake tee shirt signed by a plurality of invitees, for example, his or her classmates, to memorialize an important event, such as, for example, graduation.

The user starts 10 by visiting a website interface associated with the system, connecting to the website through the Internet, and initiates a project in the system by creating or logging into an account 20. The user inputs or confirms typical account information such as name, payment method, and other data that is well known to those of ordinary skill and beyond the scope of this discussion. The user also enters input data crucial to the system for initiating the project, such as the type of clothing article, the type of event or association that the clothing article is memorializing, and a list of whom the user wishes to invite to participate by providing a signature and selectively, a message, to be placed on the clothing article. The system acquires the input of the user. Accompanying the list of invitees, the user provides at least one email address or phone number for a phone capable of receiving text message associated with each invitee. The user can selectively input a deadline for participation if the clothing is desired in anticipation of an event as well as selectively provide at least one graphic element, such as, for example, a school emblem or a school mascot, to be included when the article of clothing is customized and printed.

The system sends a plurality of electronic invitations to the invitees by email 30, at least one to each member of the list of invitees. The term email refers to various forms of electronic communication via digital messaging and includes and is not limited to, email, text messages and SMS (Short Message Service). The invitation contains a message about the event or occasion, such as, for example, for the invitee "to sign my grad shirt" and informs the invitee of who the user is, the deadline, if there is one set, how to upload a signature or message into the system and provides an electronic link to the system. The message provides key identifying information, such as, for example, an embedded code in the link, or an identification code for manual input, so that any submission put into the system is associated with the user and the project as well as the invitee. The process followed by the invitees is indicated by a connecting circle "A" 40 and illustrated in FIG. 3 described hereinbelow.

Figure 3:
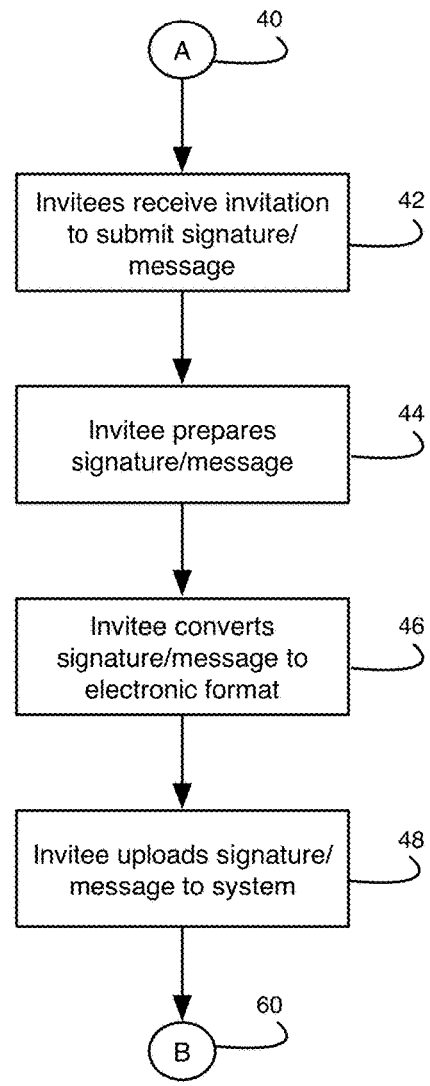
FIG. 3 is a flow diagram showing a process for participation by an invitee.

The system collects the signatures and messages from the invitees 50 after the invitee completes the process outlined in FIG. 3 as indicated by another connecting circle "B" 60. The system associates a submission of signature and message with the invitee and the user, tracks responses against the list of invitees, and stores the submissions.

The system updates the user via email 70 on the status of submissions, letting the user know who has responded and who has not responded. The updating process is demonstrated in detail in FIG. 2, and the process is completed, either by everyone participating or by reaching the deadline, as indicated by a further connecting circle "c" 80, the system continues to the next activity.

After the system notifies the user that collection is complete, the system provides to the user a software tool, the collected signatures and messages 90 and optionally, at least one graphic design provided by the user. The user lays out the collected signatures, messages and optional design elements on a template for the article of clothing. The user can choose a location for a submission based on the user's preference, putting invitees who are more intimate with the user or who wrote complimentary messages in a prominent position on the garment. The user can choose to not place inappropriate messages on the shirt. The user can decrease the size of select submissions so that all submissions can be accommodated on the garment or can increase or decrease the size to emphasize or deemphasize a submission. Once the user is satisfied with layout, the user saves the layout and places an order for printing the garment in the system.

The system produces an output of the signatures, messages, and optional graphic design printed on the shirt according to the saved layout 100 and ends the process 12.

FIG. 3 illustrates how the invitees interact with the system once the system has sent the invitations as indicated by the connecting circle "A" 40 from the overview of the system in FIG. 1. The invitee receives the invitation to submit a signature and optionally a message 42 to be included on the keepsake article of clothing with key identifying information for the user and the project. The invitee prepares the submission 44, possibly composing a special message that requires composition time. The message can be a verbal or symbolic such as a drawing of, for example, a heart, a flower, or a "smiley face." The invitee either directly or indirectly converts the submission into an electronic format by directly entering the submission into an electronic signature pad on a device or by scanning the document containing the submission into an electronic device 46. In one example embodiment, for the invitee, the input device can be a keyboard, a mouse or electronic stylus or even a figure tracing on an electronic signature pad. The invitee uploads the signature and message to the system 48 for associating with the invitee and user, tracking, and storage. In one example embodiment, SMS (short message software) software creates the electronic format and automatically uploads it to the server device. In one example embodiment of the invention, the user can edit his or her submission on line after it has been submitted up to the point of completion of the collection process. As indicated by the connecting circle "B" 60, the system continues to update the user.

Figure 3A:
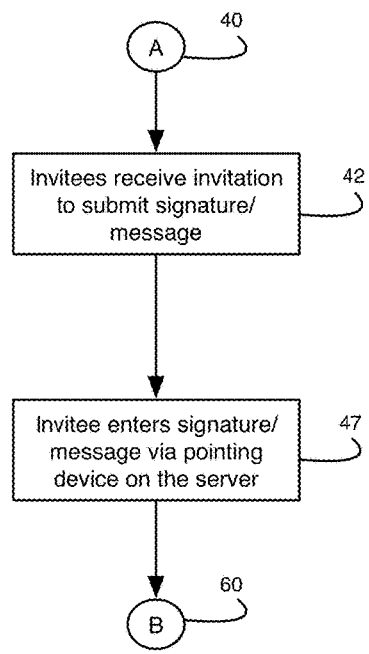
FIG. 3A is a flow diagram showing another example embodiment of the process for participation by an invitee.

In another example embodiment outlined in FIG. 3A, the invitee receives an invitation to submit a signature and message 42 as explained hereinabove. In this example embodiment, the invitee enters the signature and message using a pointing device 47 so that a digital image of the invitee's own handwriting in the signature and message is captured by the system. The signature and message is input into the system either through a client device or directly onto the server device. In one example embodiment, SMS software creates the electronic format and automatically uploads it to the server device.

The pointing device creates an electronic digital image by motion or contact with an object. The pointing device, as a non-limiting example, is a mouse, a trackball, a joystick, a finger-tracking device, a stylus, a touchpad, a touchscreen or a surface configured to detect finger contact.

Figure 2:
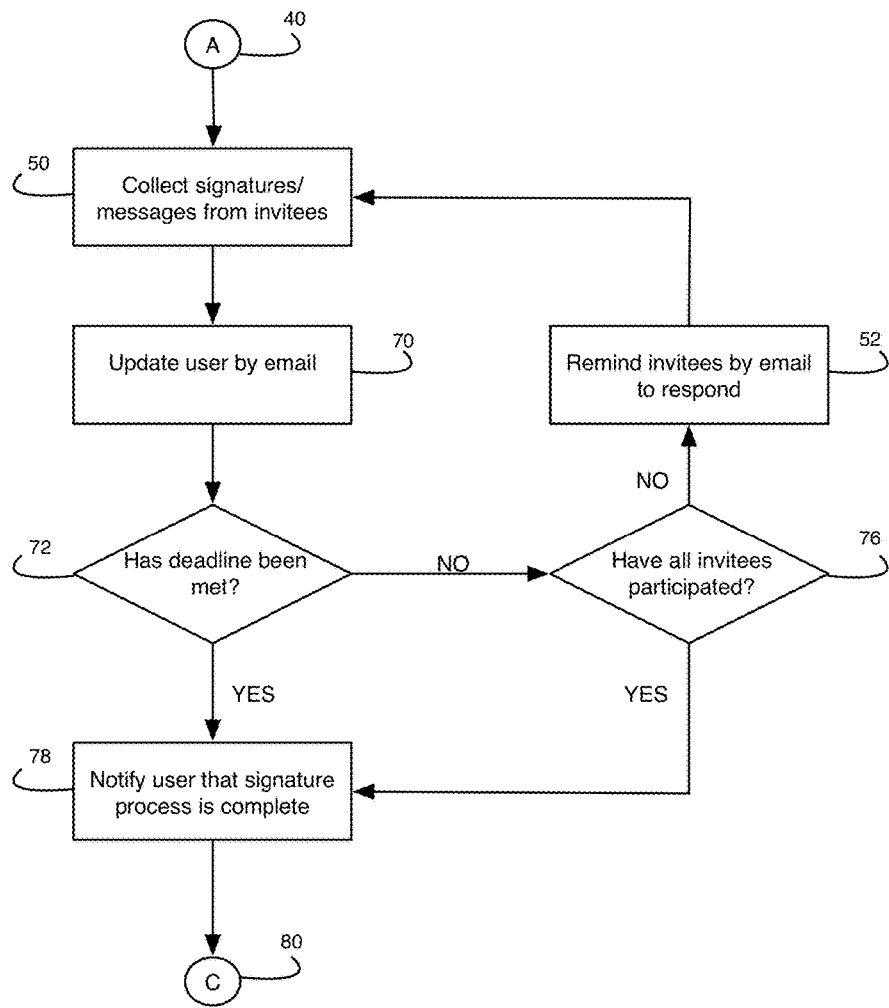
FIG. 2 is a flow diagram showing a process for collecting a message and/or a signature from an invitee and notifying a user of a status of the process.

FIG. 2 shows in greater detail how the system updates the user once the invitations have been distributed to the invitees, as indicated by the connecting circle "A" 40. The system captures and collects the signatures and messages from the invitees 50, associates the signature and message with an invitee and a user, tracks the submissions against the list of invitees. The system sends an update to the user by email 70. The update can occur every time a new submission is made or periodically, such as once a day, sending a summary of activity. The system determines if the user has set a deadline and queries to determine if deadline has been met 72. If the deadline has been met, the system notifies the user that the deadline has been met, the collection process is complete 78 and the user can continue with the composition step. If the deadline has not been met, the system queries if all the invitees have submitted a signature and message 76. If all the invitees have made submissions, the system notifies the user that the collection process is complete and the user can continue with the composition step 78. If all the invitees have not made submissions, the system sends a reminder to the invitees about the invitation 52 at a frequency set by the user, such a daily or weekly, until the collection process is complete. The system then moves to the next step, as indicated by the connecting circle "C" 80 and provides the tools, submissions and any optional graphic designs to the user to lay out for printing on the article of clothing.

Figure 4:
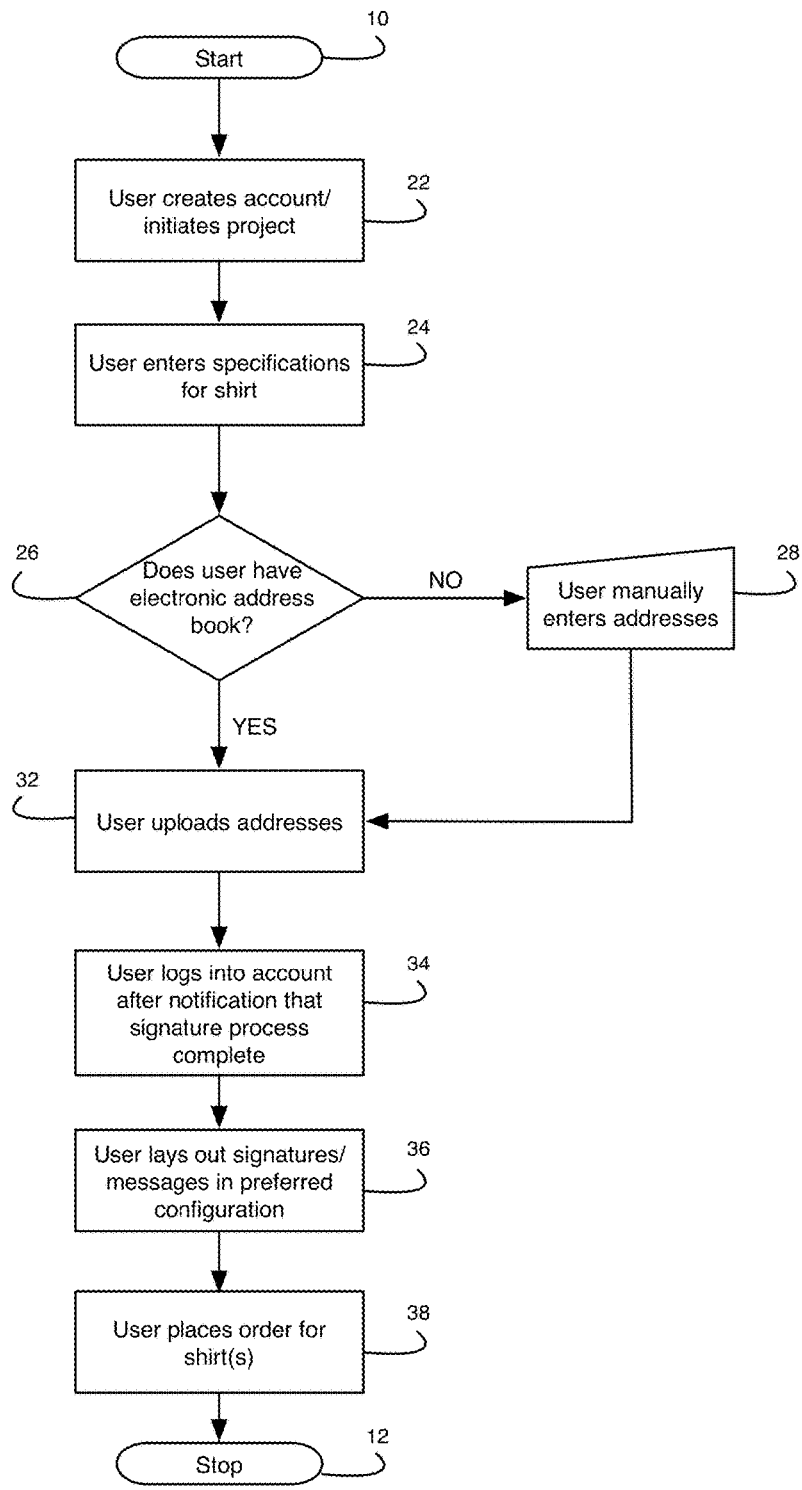
FIG. 4 is a flow diagram showing a process in detail of a user customizing an article of keepsake clothing.

FIG. 4 outlines how the user interacts with the system. The process starts 10 and the user initiates by creating an account or confirming account information to initiate the project 22. The user enters the specification for the article of clothing 24, specifying that is a tee shirt, for example, the base color of the article of clothing, the size or sizes, and quantity if ordering multiples, the deadline, if any, as well as the nature of the event or association. The user creates a list of invitees, associating as least one electronic address, such as an email address or telephone number of phone capable of receiving text messages. If the user has an electronic address book 26, the user uploads the address book 32 and creates the list by selecting invitees. If the user does not have an electronic address book 26, or there are additional invitees who are not in the address book, the user manually enters the invitee 28 and the associated address. Once the system notifies the user that the collection process is complete, the user logs into the account 34. Using the tools provided, the user lays out the signatures, messages, and any optional graphical design on a template of the article of clothing until the user is satisfied 34. In one example embodiment, the system provides an avatar based on dimensions provided by the user to display a three dimensional image of the customized article as it would appear when worn. Upon completion of the layout, the user places an order for the clothing, in this example, a tee shirt, ordering at least one to be printed and sent 38, ending the process 12.

In one example embodiment, the system provides the user with a unique URL (Uniform Resource Locator) that links to the user. The user copies and pastes their unique URL link and invite friends through email or social media, such as FACEBOOK®, TWITTER® as non-limiting examples, using the link. (FACEBOOK® is the registered trademark of Facebook, Inc., Menlo Park, Calif. TWITTER® is the registered trademark of Twitter, Inc., San Francisco, Calif.) This way the invitation is sent by a known person and will not be treated as spam. The invitee clicks on the link and the system first queries their name so that the user can identity that signed. If the invitee has multiple inputs or two invitees have the same name, the system assigns a number to the name.

Figure 5:
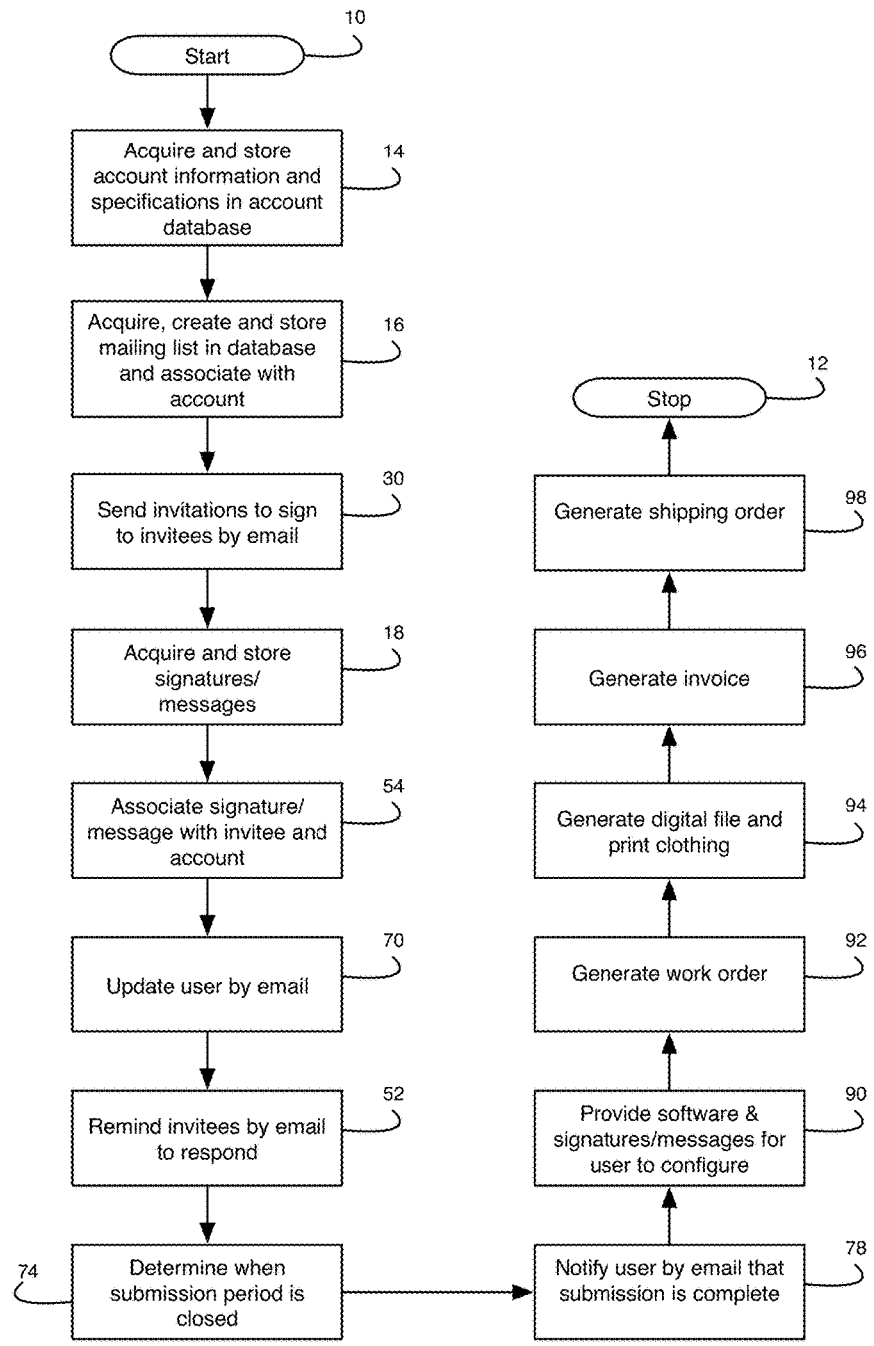
FIG. 5 is a flow diagram showing the process in detail for customizing an article of keepsake clothing for delivery to the user.

FIG. 5 illustrates the functions performed by the system. Once the project starts 10, the system acquires and stores account information and specifications in an account database 14. The system acquires, creates and stores the mailing list in database and associates the list with the account in the account database 16. The system sends invitations to invitees by email 30. The system acquires and stores signatures and messages 18 and associates the signature and message with the invitee that uploaded the submission and the user account 54. The system updates the user by email 70 on the basis set by the user, either after each submission, or periodically, such as daily for example. The system reminds those invitees 52 who have not yet participated on a periodic basis set by the user, such as daily or weekly. The system determines when the submission period is closed by comparing the current date against the date set as a deadline by the user or by determining if the set consisting of the invitees who have not responded is an empty set 74. The system notifies the user by email that the submission period is closed once the system determines it is closed 78. The system provides the user a software tool, the collected signatures and messages and optionally, at least one graphic element selected by the user 90. When the user completes the layout of the customized article of clothing and submits a final individualized graphic design, the system generates a work order 92, linking the design with the specifications for the article of clothing entered by the user at the initiation of the project. The system commands the printer to print a transfer sheet onto the article of clothing 94. In one example embodiment, the system commands the print to directly print electronic graphic file directly on the article of clothing. The system generates an electronic invoice and related accounting transactions 96, the details of which are well known by those of ordinary skill and are beyond the scope of this discussion. The system generates a shipping order 98, using the account information entered by the user at the initiation step, and the project stops 12 as completed. Shipping order systems are likewise well known by those of ordinary skill and are beyond the scope of this discussion.

Figure 5A:
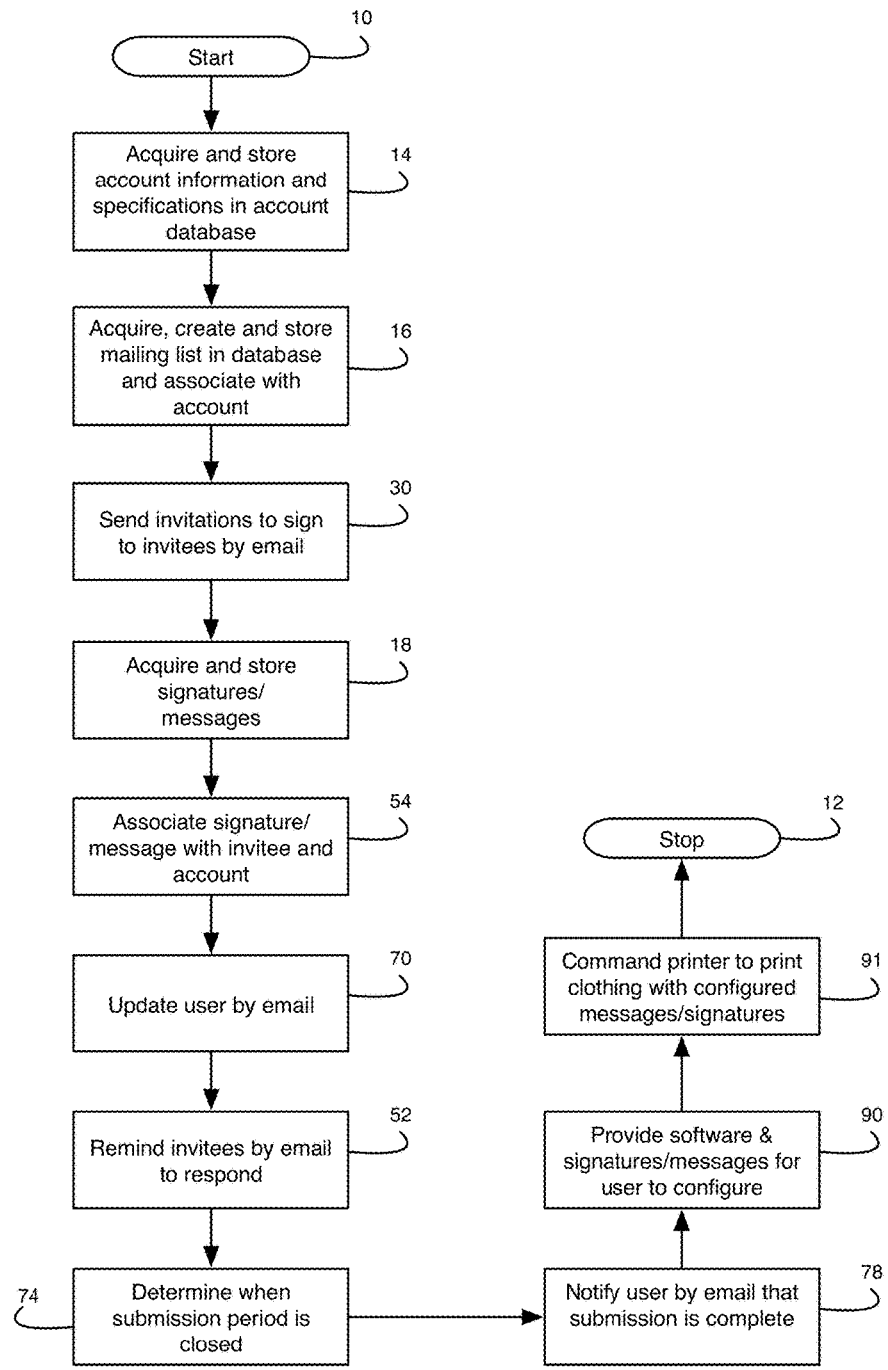
FIG. 5A is a flow diagram showing another example embodiment of the process in detail for customizing an article of keepsake clothing for delivery to the user.

FIG. 5A is a further example embodiment of the system, similar to the system explained hereinabove. In the example embodiment, the system commands the printer to directly print electronic graphic file directly on the article of clothing 91. The electronic graphic file has a specific placement on the article of clothing that is specified by the user. The electronic graphic file includes a handwritten signature input by a pointing device. The electronic graphic file can include a handwritten message associated with the signature, the message input by a pointing device.

Figure 6:
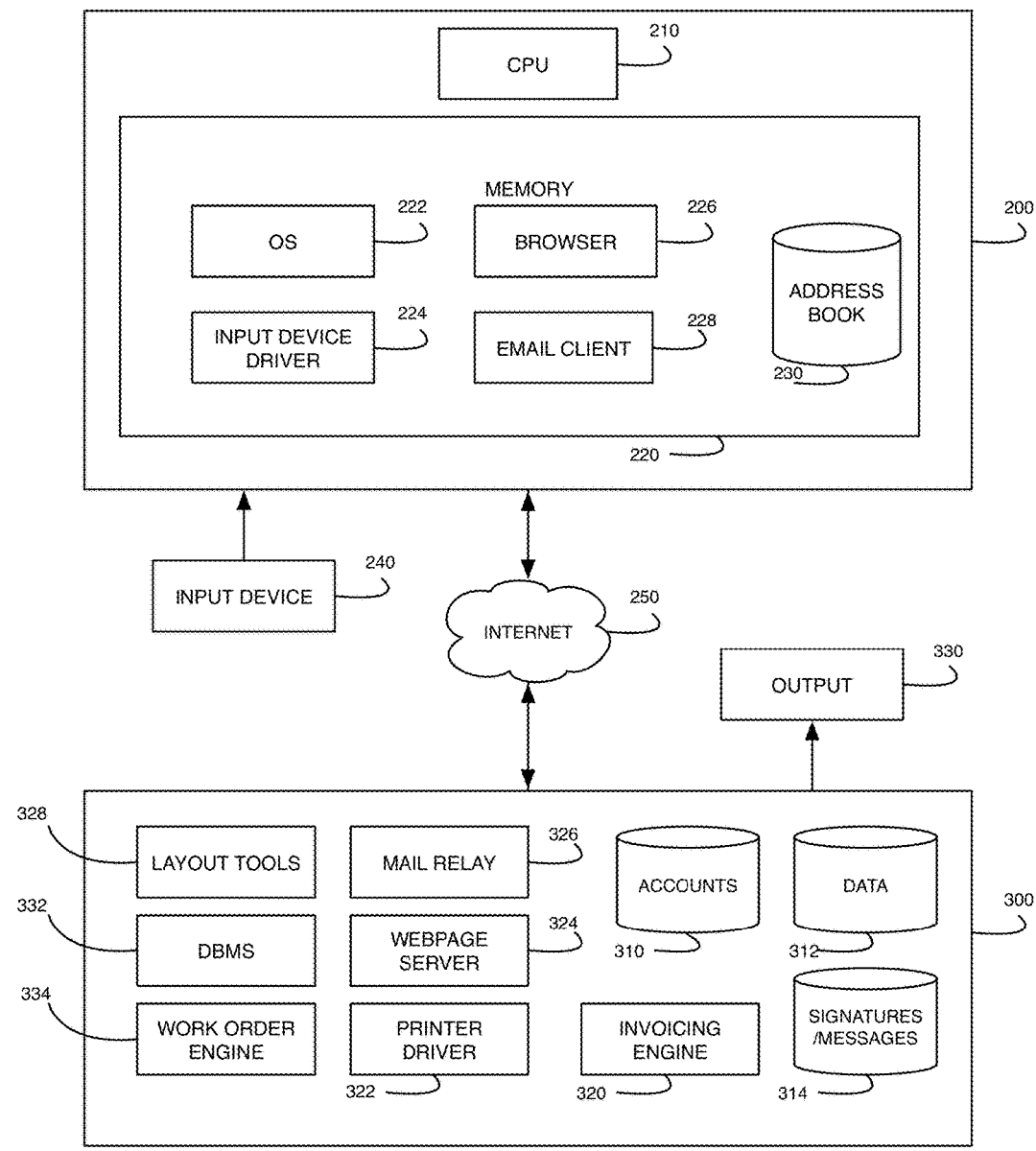
FIG. 6 is a block diagram of the system for customizing an article of keepsake clothing.

FIG. 6 shows a block diagram representing the software components of the system. The user and invitees interact with the system by a client electronic personal computing device 200 such as a computer, a smart phone or an electronic pad. The client device 200 has a central processing unit (CPU) 210 and memory 220 that includes, but is not limited to, an operating system (OS) 222, a web browser application 226, an email client application 228, and an input device driver 224. The electronic device 200 used by the user preferably has an address book database 230, the address book. Connected to the client device 200 is an input device 240 for entering data, signatures and messages. For the user, the input device 240 can be a keyboard, a mouse or electronic stylus or even a figure tracing on an electronic signature pad. For the invitee, the input device 240 can be an electronic signature pad or a scanner. The client device 200 connects to the system 300 through the Internet 250. The system 300 contains a plurality of applications and plurality of storage units. The system includes, but is not limited to, a layout tools application 328, a database management system 332, a work order engine 334, a mail relay server 326, a webpage server 324, a printer driver 322, and an invoicing engine 320. The storage units include, but are not limited to, an account database 310, a signature submission database 314 and an invitee database 312 having a list of invitees. The database management system 332 associates the records in each database with the user for the project. If the user has electronic address book including the invitees on the personal computing device, the user uploads the address book to the invitee database on the server. The system 300 is connected to at least one output device 330 that prints the customized article of clothing.

Figure 7:
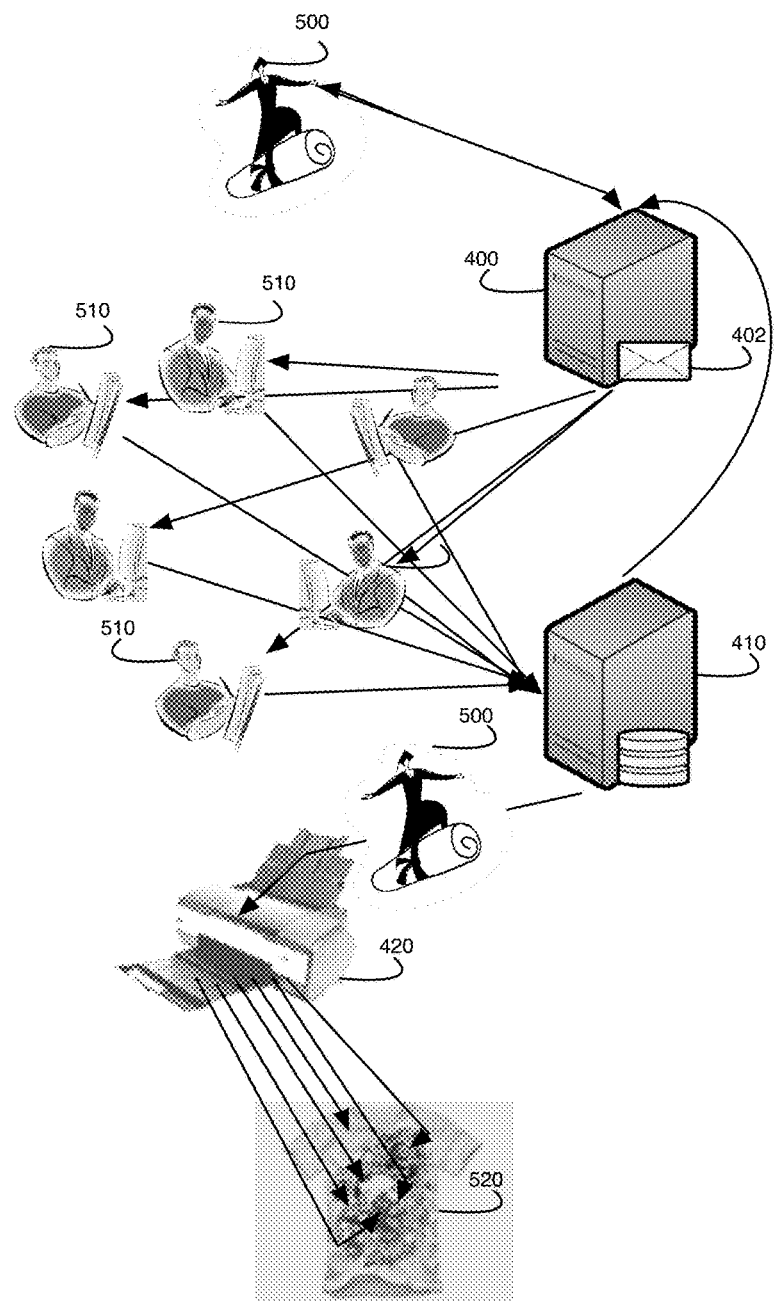
FIG. 7 is a diagram representing a plurality of interactions of the user and the invitees with the system.

FIG. 7 shows in a graphical representation an overview of how the system interacts with the user and invitees in an exemplary event, such as a graduation. The user 500, portrayed as a graduate, initiates the project with the necessary input, such as the list of invitees with the associated email or phone number. The email server 400 sends out the invitations 402 to "sign my grad shirt" to the invitees 510. The invitees 510 respond with submissions that are stored in a database on a server and are associated with the invitee and the user. The database on the server tracks submissions and triggers email updates to the user when triggered by preset events. The email server 400 sends updates to the user 500. When the submission is complete, the database server provides the submissions to the user 500 for layout. The user 500 lays out the submissions and any optional graphic element that the database server provides to the printer 420. The printer prints the layout on the clothing, in this example, the tee shirt 520, showing how the submission of the invitees are distributed on the shirt creating the individualized graphic design.

Figure 8:
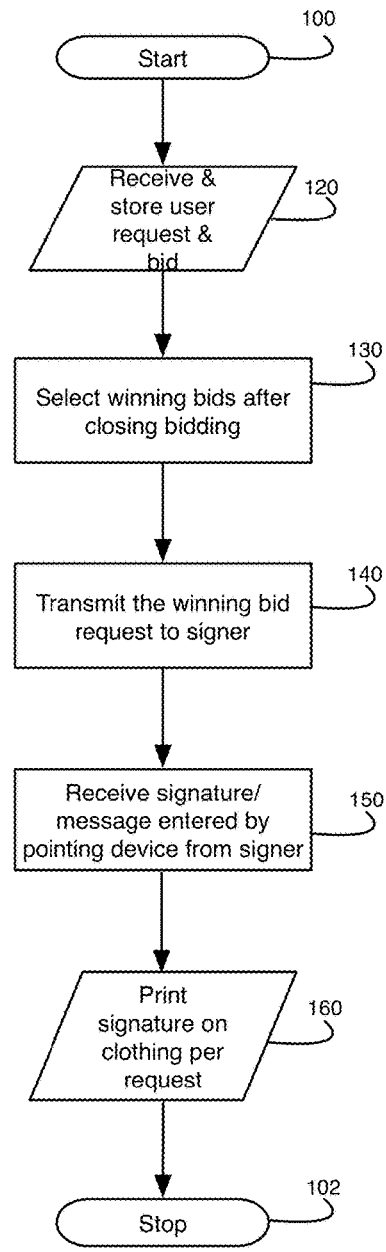
FIG. 8 is a flow diagram showing a process for bidding on a celebrity signed article of clothing.

FIG. 8 illustrates another example embodiment of the system. In addition to the desire to collect the autographs of friends at major milestones on an article of clothing, yearbook or autograph book, others desire to collect celebrity autographs. The celebrity autographs are on clothing, autograph books or other objects like a game ball. In this example embodiment, the user picks a celebrity whose autograph the user desires and bids for the opportunity to receive a personalized message and signature. In this example embodiment, the system offers a plurality of celebrities to choose among, in another embodiment, the system features one celebrity for the auction. In another example embodiment, the user can bid on a plurality of celebrities. In this disclosure, the term celebrity can mean an individual who is famous or a group of individuals who are associated together such as a sports team, band or performing group.

At least one user starts the process on the server device 100. The server device receives the user celebrity selection in a request with a bid and stores the request, associating the bid with the user request 120. The request includes the celebrity. In one example embodiment, the request includes specific user-defined content for a personal message. In another example embodiment, the request includes the specific placement of the signature and any associated message on the article of clothing. In yet another example embodiment, the request includes specific details about the article of clothing such as type, style, size and color.

The server device selects the winning bid after the bidding is closed. In one example embodiment, there are a number of winning bids. The number is pre-set. The number of winning bids is determined by the celebrity or the system in order to maintain value of the signature and prevent a market glut of that celebrity's memorabilia.

The server device electronically transmits the requests associated with the winning bid to the celebrity signer 140. In another example embodiment, the server device transmits a display of the plurality of winning bids and user-defined content for the personalized message in sequence. The celebrity writes the message and signature using a pointing device as described hereinabove. The server device receives the message and signature from the celebrity signer that the celebrity signer entered using the pointing device 150. In one example embodiment, the pointing device connects directly to the server device.

The server device commands a printer configured for printing on clothing to print the signature and other content associated with the winning bid. The server device commands the printer to print the signature and message onto the article of clothing 160, ending the process 102. In one example embodiment, the user specifies the placement of the signature on the clothing and the server device transmits the instruction for placement to the printer.

Figure 9:
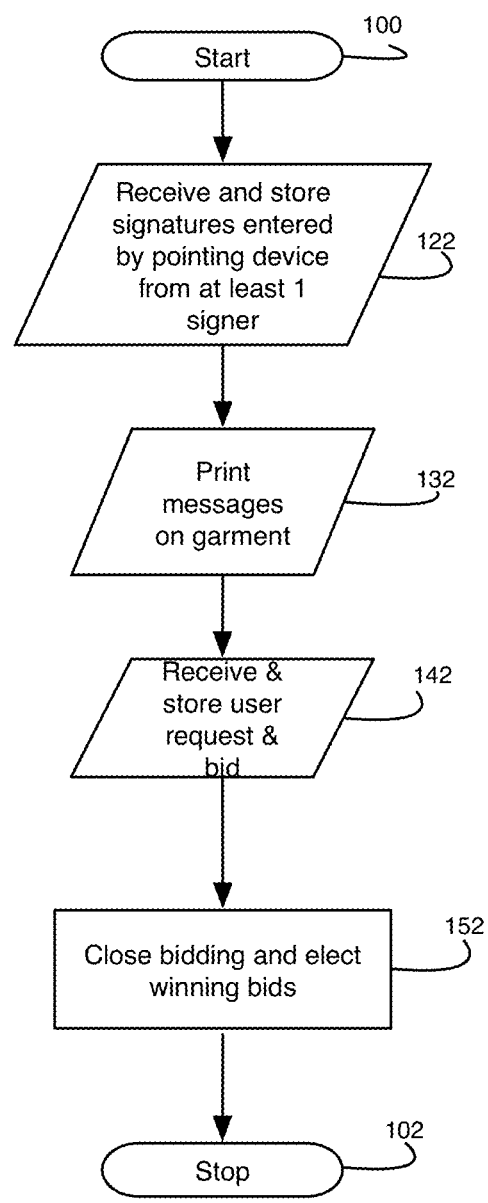
FIG. 9 is a flow diagram showing another embodiment of the process for an auction of a celebrity signed article of clothing.

FIG. 9 shows another example embodiment in the system. The user is a charity or organization that wishes to monetize celebrity signatures. The user selects at least one celebrities and the at least one celebrity agrees to participate. The server device receives and stores at least one signature entered by the at least one celebrity signer who inputs the signature by the pointing device 122. The system instructs the printer to print the clothing 132. The server device receives and stores the user request and bid 142. The server device closes the bidding and selects at least one winning bid 152. In one example embodiment of the method, the printing is performed after the winning bids are selected so that any specific request for the article of clothing specifications such as size or style can be fulfilled.

Figure 11:
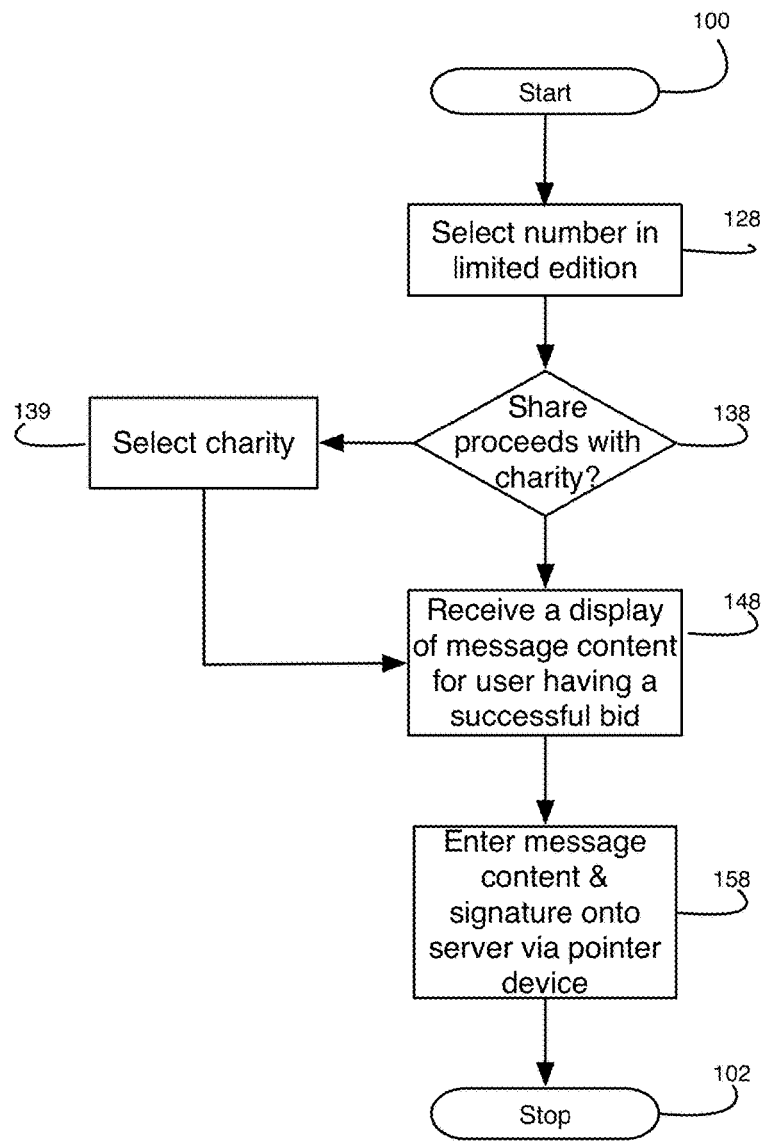
FIG. 11 is a flow diagram showing the process for a celebrity signing a message and autograph.

FIG. 11 shows the process that the celebrity follows. The process starts 100 by the celebrity, celebrity representative, such as an agent or manager, or system selecting the number in a limited edition of articles of clothing in order to preserve the value of the articles of clothing 128. The celebrity, celebrity representative or the system decides whether a charity will benefit from the auction 138. The celebrity, celebrity representative or system selects the charity or charities if the decision is yes 139. The celebrity receives a display of the message content that is to be handwritten into the system using a pointing device 148. If there is more than one winning bid, the display is in a sequence. The celebrity enters the message and signature onto the server device using the pointer device. In one example embodiment, the celebrity directly enters the message and signature onto the server device using the pointing device 158. The celebrity can execute these signatures and messages remotely in a comfortable location via the Internet and a client device connecting the pointing device to the server device. The process stops when the required signatures have been entered onto the server 102.

Figure 12:
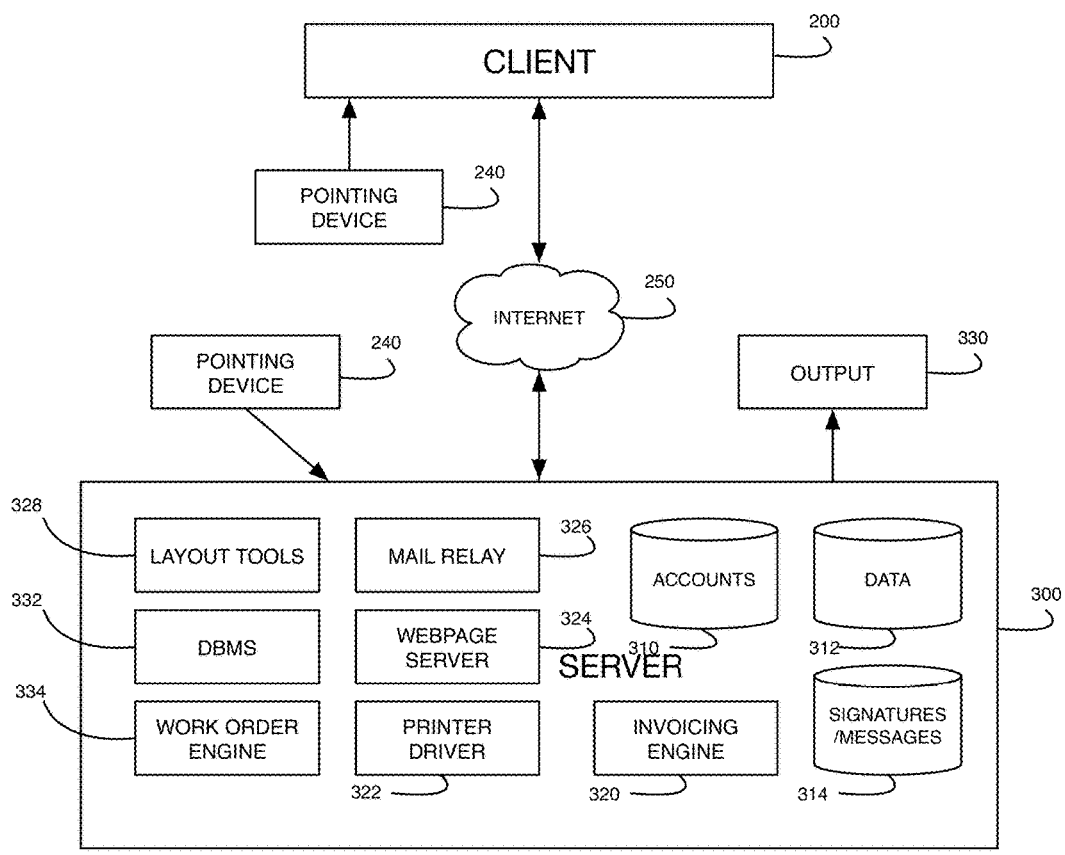
FIG. 12 is a block diagram of a further example embodiment of the system for customizing an article of keepsake clothing.

FIG. 12, similar to FIG. 6, shows the components of the system. At least one client device 200 is for entry of the user request and bid onto the server device 300 via a network 250. In another example embodiment, a second client device 200 connects the pointing device 240 of the celebrity to the server device 300. In another example embodiment, the pointing device 240 of the celebrity connects directly to the server device 300. The printer is represented by block 330, labeled as output. The remaining components of the server device 300 is as described hereinabove.

Figure 10:
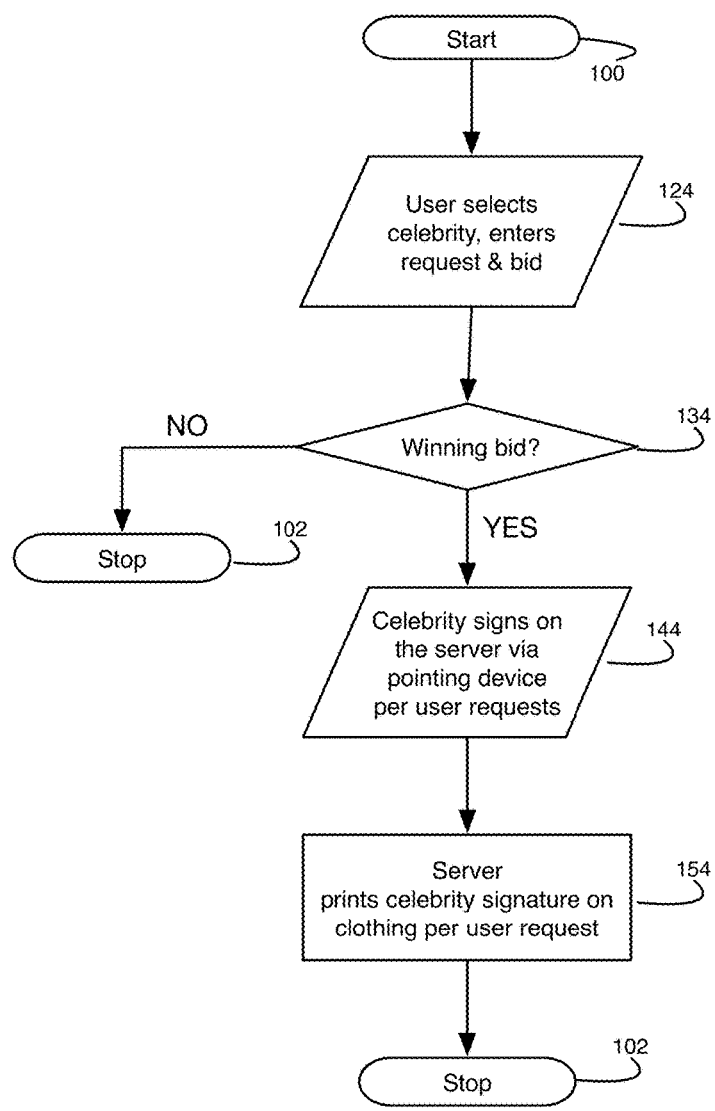
FIG. 10 is a flow diagram showing the input processes for an auction of celebrity signed article of clothing.

FIG. 10 shows the general method of this example embodiment. The process starts 100 by at least one user inputting through a client device onto a server device a selection of a celebrity, a request for a signature and a bid, the selection and the request associated with the bid 124. The server selects the winning bid among the bids input by the at least one user 134. If the user loses the bid, the process stops 102. The winning bids are transmitted to the celebrity and the celebrity The selected celebrity inputs the signature into the server device and the content associated with the winning bid, the signature provided by the celebrity through the pointing device connecting to the server device 144.

The server device commands and instructs the printer configured for printing on clothing to print the signature onto an article of clothing according to the request associated with the winning bid 154.

In one example embodiment, the user input includes in the request a specific content for a personalized message from the selected individual celebrity, the personalized message associated with the signature and the bid. The celebrity inputs the specific content for the personalized message when providing the signature, using the pointing device.

In another example embodiment, the selection and the request associated with the bid includes the user inputting a specific arrangement of the signature and personalized message on the article of clothing, the arrangement associated with the bid. The server device commands the printer to print the signature and any message according to the arrangement associated with the winning bid.

It is understood that the above example of a graduation tee shirt is a non-limiting example of how the system functions. The invention is not limited to a graduation event, but can be employed for any major milestone such as a bar mitzvah, confirmation, engagement or wedding or for more reoccurring events, such as an end of the school year, for a special teacher, for an end of summer camp or a special holiday. The system includes celebrities and auctions of the article of clothing signed by celebrities or an auction for the opportunity to choose a message from a celebrity. The system can be employed for associations such as fantasy sport teams, teams, departments within a company, bunkmates, dorm mates, and religious youth groups. The system includes celebrities and auctions. The user need not be a celebrant, but an intimate who may desire to surprise the graduate, the fiancée, or special friend with a keepsake article of clothing. The example illustrated in FIG. 7 shows the customized article as a tee shirt 520. It is understood that the invention applies to any article of clothing, such as, for example, but not limited to tee shirts, sweatshirts, caps, uniforms, and sweat pants, as well as shirts and clothing for pets. As indicated by the above non-limiting examples, the choices of events and associations are almost countless as well as the choice of the article of clothing to customize as a keepsake within the inventive concept as presented.

Figure 13:
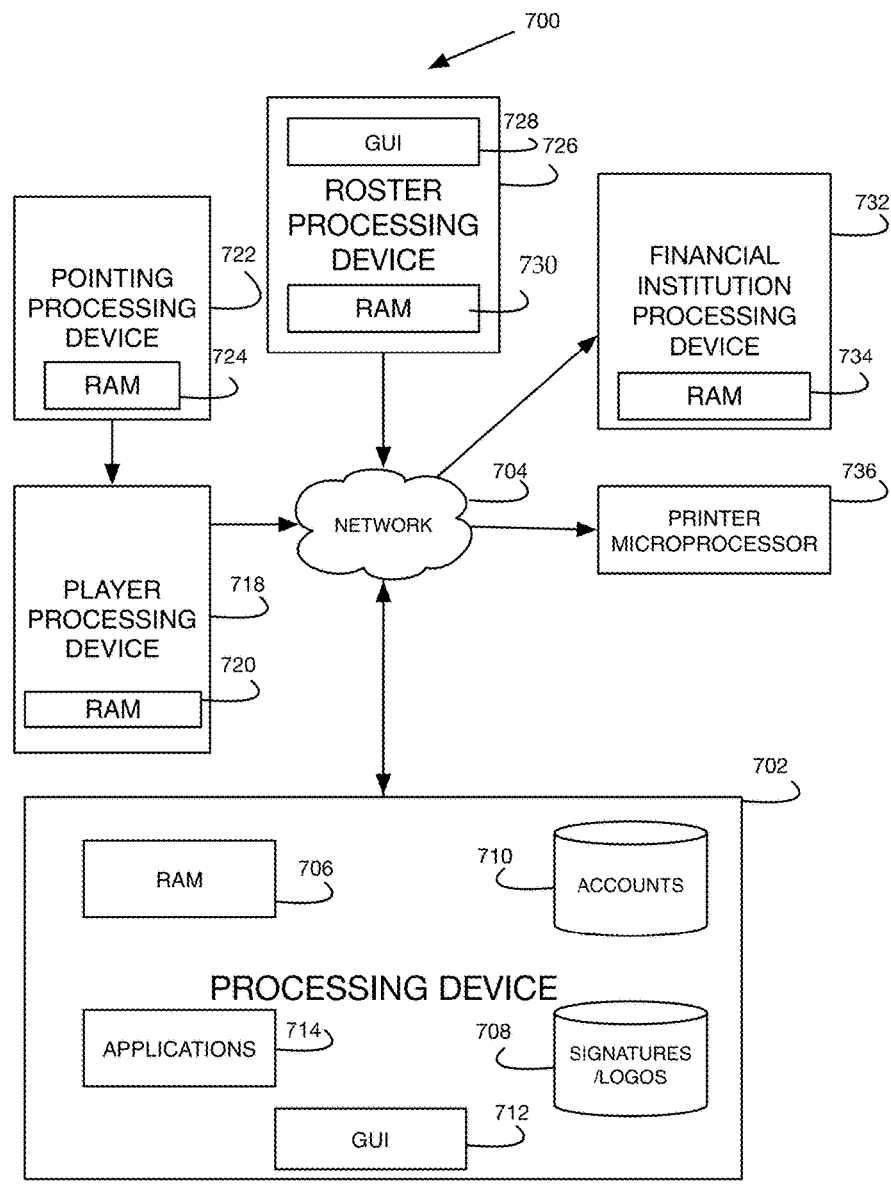
FIG. 13 is a block diagram of the system for customizing an article of clothing displaying a fantasy sport team roster.
Figure 14:
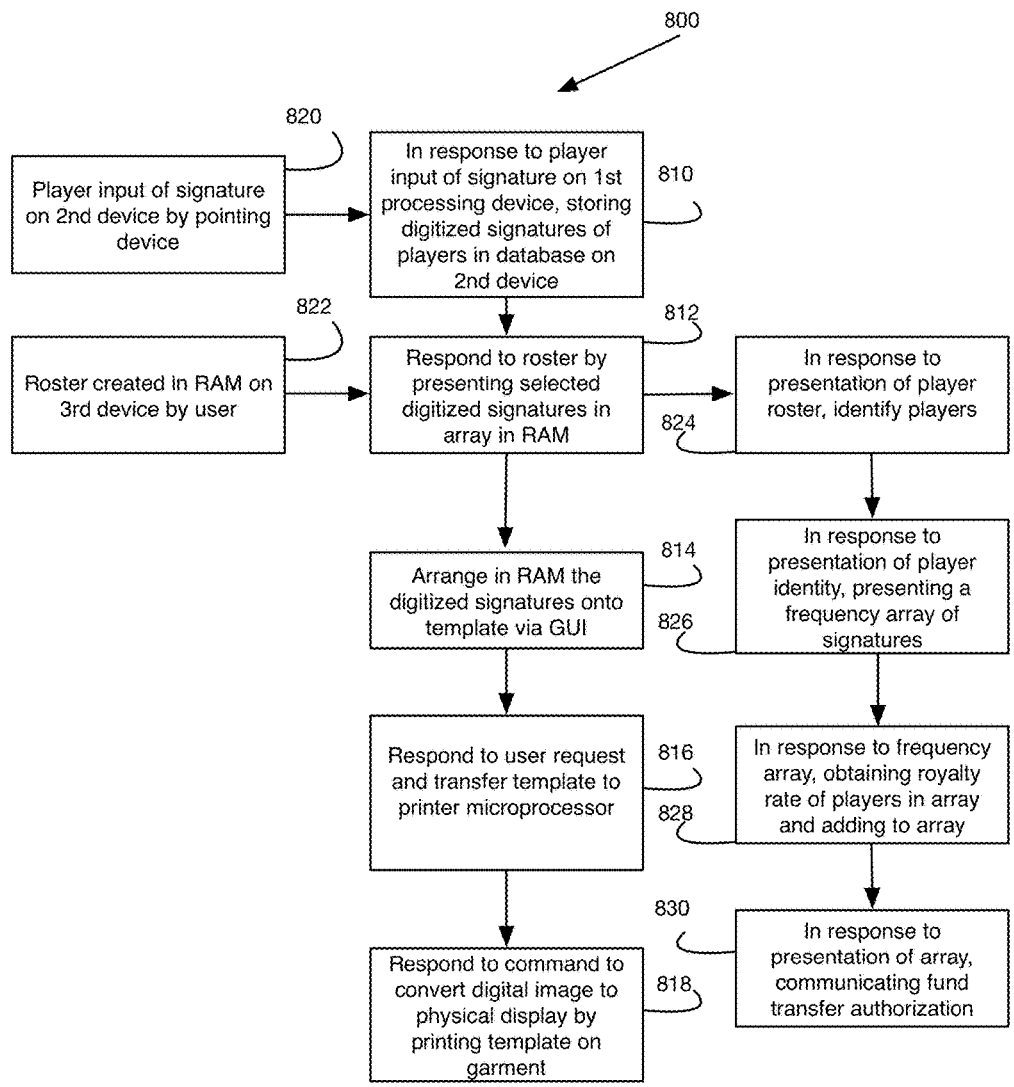
FIG. 14 is a flow diagram of the system for customizing an article of clothing displaying a fantasy sport team roster.
Figure 15:
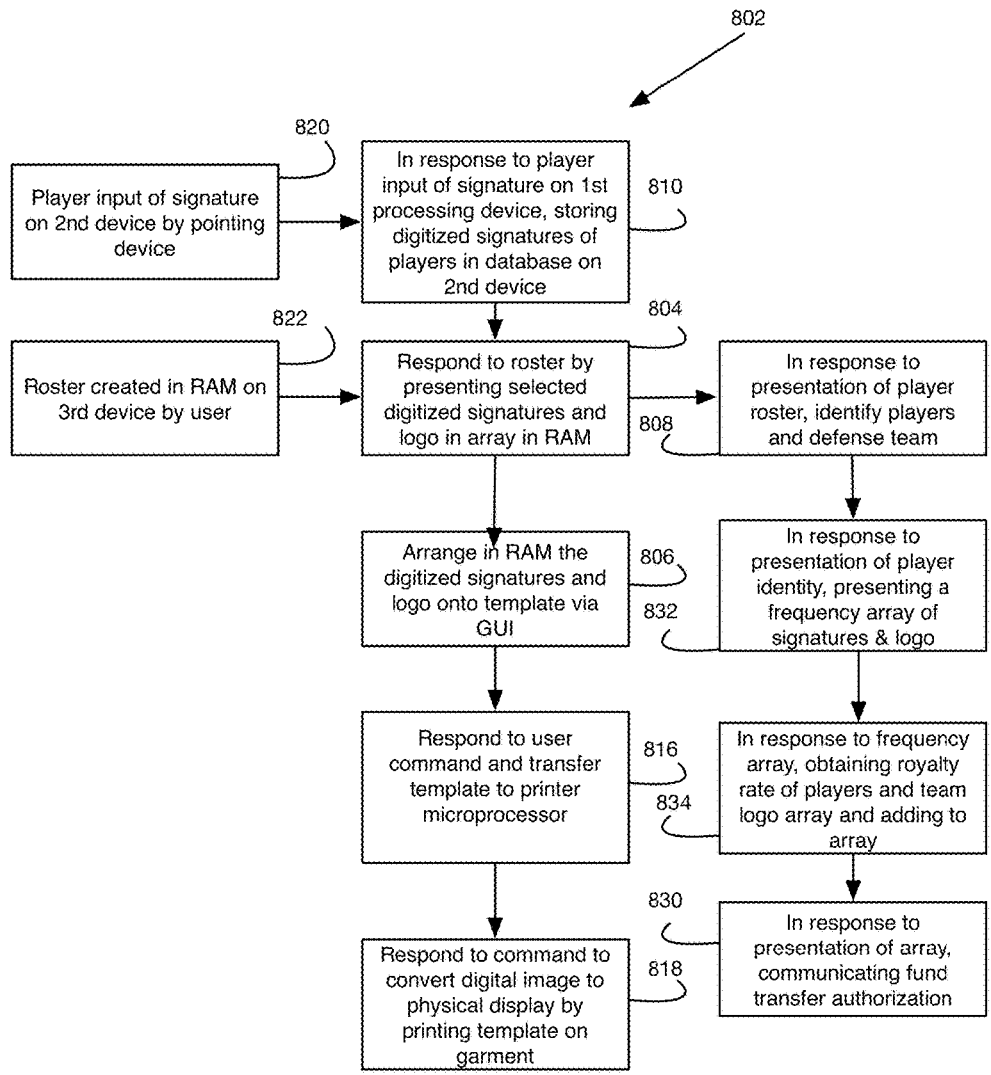
FIG. 15 is a flow diagram of the system for customizing an article of clothing displaying a fantasy football team roster.

FIGS. 13-15 illustrate a system for creating an article of clothing based on a fantasy sport team. It is well known among those of ordinary skill in the art that there are many ways for a user who plays fantasy sports to create a roster for a fantasy team. In some versions, the user bids against other users on the athletes, generally filing each position in the team with at least one player. As the season progresses, users trade players with other users to create a better team roster. Sometimes these transactions of picking, bidding and trading are done manually on paper and sometimes through a website. In some versions of fantasy sports, the players are assigned randomly to a user and the user works on negotiating a better team with other users. A user wins by determining the score of the user's team by adding up the points scored by the fantasy players in a recent actual game and compares the score to another user with a different set of fantasy players on his or her team.

Football, the most popular fantasy sport, presents a unique problem. Unlike basketball, baseball, soccer, and rugby, where players play both defense and offense, football has specialty squads and players on the offensive squad do not play defense nor do defensive players play offense. The offense generally scores points as individuals, but the defense depends on teamwork to stop the offense. In fantasy football, the defensive squad is not represented by individual prayers, but by an entire defense squad of a professional team. A user picks a roster by selecting individual football players for the offense roster and a defense squad from the teams in the National Football League to complete the roster. Similarly, the same rules apply to collegiate fantasy football, if a user plays in such a fantasy league.

FIG. 13 shows the system 700 having a plurality of processing devices to produce a fantasy team article of clothing such as a tee shirt, sweat shirt and other garments as described hereinabove. While it is understood that processing devices generally have Random Access Memory (RAM), the block diagram includes RAM in order to understand how strings are created and moved in the system 700.

The system 700 has a first processing device 702 in communication with a second (player) processing device 718, a third (roster) processing device 726, financial institution processing device 732 and printer microprocessor 736, all communicating through a network 704 such as the Internet.

The first processing device 702 has RAM 706, and database storage for signature strings 708 and accounts 710, applications 714 and a graphical user interface (GUI) 712 in memory.

The second processing device 718 receives input from a pointing processing device 722 having RAM 724. The pointing device is described hereinabove. The second processing device 718 has RAM 720.

The third processing device 726 has RAM 730 and a GUI 728. The Financial Institution Processing Device 732 has RAM 734.

A first processing device 702 is in communication with other processing devices through the network 704 such as the Internet. The first processing device 702 has random access memory 706, a plurality of database storage such as database storage 708 for a plurality of player signatures. In one embodiment, useful for fantasy football users, the database storage 708 includes a plurality of defense squad logos. The first processing device 702 has database storage 710 for accounting information operative for calculating royalty fees. The first processing device 702 has a graphical user interface 712 for arranging digitized signatures, and in the embodiment for fantasy football users, defense squad logos, digitized onto an electronic template. The first processing device 702 also has a plurality of software applications in memory 714.

A second processing device 718 captures player signatures created on a pointing processing device 722 as described hereinabove. The signatures are digitized in RAM 724 on the pointing device turning the signatures into digital signature strings. The pointing device 722 is in communication with the second processing device 718. The second processing device 718 processes the signatures in RAM 720 creating an array of digital signature strings associated with players. The second processing device 718 then transfers the array of digital signature strings to the first processing device 702 through the network 704.

The user presents a roster in a roster (third) processing device 726. The user can enter the roster manually, but preferably creates the roster through a fantasy sport website.

Regardless of how the roster enters the roster process device 726, or whether the roster processing device is a website server or other electronic processor, the roster is created in RAM 730 and them communicated through the network 704 to the first processing device 702.

The first processing device 702 presents a plurality of digital signature strings in RAM 706 in response to the roster presented in RAM 730. The roster processing device 726 has a graphical user interface 728 for the user to arrange the digital signature strings once retrieved from the first processing device 702 in response to the presentation of the roster. The user, using the graphical user interface 728, arranges the digital signature strings onto an electronic template in RAM 730. In one embodiment, using the graphical user interface 712 on the first processing device 702, arranges the digital signature strings onto an electronic template in RAM 730.

A printer microprocessor 736 is in communication with the first processing device 702 through the network 704 for converting an electronic template of signature strings to a physical display.

The first processing device 702 is in communication through the network 704 with financial institution processing device 732, the financial institution processing device having RAM 734.

Referring to FIG. 13 and FIG. 14, a method comprising the following steps to produce a fantasy team article of clothing such as a tee shirt, sweat shirt and other garments as described hereinabove.

In block 812, in response to the presentation of a fantasy sport team roster, the first processing device 702 presents a plurality of digital signature strings in a roster array in RAM 706.

In block 814, in the first processing device 702, the digital signature strings are arranged in RAM 706 within an electronic template in response to a user input via the (GUI). In one embodiment, the GUI 712 is on the first processing device 702. In a further embodiment, the GUI 728 is on the third processing device 726.

In block 816, the electronic template with the digital signature strings transfers from RAM 706 in the first processing device 702 to a printer microprocessor 736 in response to a command from the first processing device 702; and In block 818, the printer microprocessor 736 converts the electronic template with the digital signature strings to a physical display by printing onto a garment in response to a further command in the printer microprocessor 736.

Prior to the step described in block 812, the step in block 810 may be performed by the first processing device 702 in response to a player input of a signature in RAM 720 of the second processing device 718, storing said signature is stored as a digital signature string in memory in a database 708 in the first processing device 702.

The player input of the signature 820 in RAM 720 of the second processing device 718 is presented through from RAM 724 in a pointing processing device 820 associated with the second processing device 718.

As explained hereinabove, the second processing device 718 is in communication through the network 704 with the first processing device 702, operative for transferring a copy of the digital player signature string to the first processing device 702 for storage in the database 708 until the fantasy sport team roster array is presented in RAM 706 of the first processing device 702.

As described in block 822, the fantasy sport team roster is created in an array in RAM 730 in a third processing device 726 that is in communication through the network 704 with the first processing device 702.

As described in block 824, in response to the presentation of the digital player signature strings in RAM 706 of the first processing device 702, said strings selected in response to said roster array, the first processing device 702 creates an array of players upon identification of players who signature strings are in the roster array.

As described in block 826, the first processing device 702 presents a frequency array of frequency associated with player signatures in response to a request for a license fee calculation.

In response to the step in block 826, as shown in block 828, the first processing device obtains the royalty rate of each player whose signature is stored as a digital signature string from accounts database storage 710, and calculates in RAM 706 the licensing fee for each player based on a frequency in the frequency table and said royalty rate of each player.

In response to said calculation, the first processing device 702 communicates to a further processing device 732 at a financial institution authorizing funds to transfer to each player's account as shown in block 830.

In one embodiment, a slightly different method 802 uses when the fantasy sport team contains a defense squad represented by a team logo and not an array of individual players. In this embodiment the sport is football and the entire defense squad of a non-fantasy team is represented by logo of said team and is referred to as the defense squad logo hereafter.

Referring to FIG. 15, In block 804, in response to the presentation of a fantasy football team roster, the first processing device 702 presents a plurality of digital signature strings and defense squad logo in a roster array in RAM 706.

In block 806, the first processing device 702 arranges the digital signature strings and defense squad logo in RAM 706 within an electronic template in response to a user input via the (GUI). In one embodiment, the GUI 712 is on the first processing device 702. In a further embodiment, the GUI 728 is on the third processing device 726.

In block 816, the electronic template with the digital signature strings transfers from RAM 706 in the first processing device 702 to a printer microprocessor 736 in response to a command from the first processing device 702; and In block 818, the printer microprocessor 736 converts the electronic template with the digital signature strings to a physical display by printing onto a garment in response to a further command in the printer microprocessor 736.

As described hereinabove with regard to block 822, the fantasy sport team roster is created in an array in RAM As described hereinabove with regard to block 824, the first processing device 702 creates an array of players upon identification of players who signature strings are in the roster array.

As described in block 808, in response to the presentation of the digital player signature strings and defense squad logo in RAM 706 of the first processing device 702, said strings and said logo selected in response to said roster array, the first processing device 702 creates an array of players upon identification of players who signature strings are in the roster array on the roster processing device 400. The players input signatures into a player processing device 510 using a pointing process device. The player processing device communicates to the first processing device 410 which in turn communicates with the printer microprocessor 420 to produce the physical image onto the garment 520.

As described in block 832, the first processing device 702 presents a frequency array of frequencies associated with player signatures in response to a request for a license fee calculation.

In response to the step in block 832, as shown in block 834, the first processing device obtains the royalty rate of each player whose signature is stored as a digital signature string from accounts database storage 710, and calculates in RAM 706 the licensing fee for each player based on a frequency in the frequency table and said royalty rate of each player.

In response to said calculation, the first processing device 702 communicates to a further processing device 732 at a financial institution authorizing funds to transfer to each player's account as shown in block 830.

It is understood that the methods described hereinabove may be repeated as the fantasy team roster changes, so that a new garment is printed with the revised team roster.

The hardware for the method described is shown in FIG. 7, as a graphical representation of an overview of how the system interacts with the user and players. The user 500, presents a roster array of the fantasy sport team in the third processing device 400 that may include a fantasy sport website. The players enter signatures via pointing device in communication with a second processing device 510. The third processing device 400 sends the roster to the first processing device 410. The first processing device 410 sends the signature strings to the printer microprocessor 420. The printer prints the clothing, in this example, the tee shirt 520.

The disclosed example embodiments may individually and/or collectively be components of a larger system, wherein other procedures may take precedence over or otherwise modify their application. Also, a number of steps may be required before, after, and/or concurrently with the following embodiments.

As will be appreciated by one skilled in the art, aspects of the present disclosure may be embodied as a system, method or computer application. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer application embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. In the context of this document, a computer readable storage medium may be any tangible medium that can contain, or store an application for use by or in connection with an instruction execution system, apparatus or device.

A computer readable signal medium may include a propagated data signal with computer readable code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport an application for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer code for carrying out operations for aspects of the present disclosure can be written in any combination of one or more programming languages. The code may execute entirely on the user's computer, partly on the user's computer, as a stand-alone software package, partly on the user's computing device and partly on a remote computing device or entirely on the remote computing device. In the latter scenario, the remote computing device may be connected to the user's computing device through any type of network, including a local area network (LAN) or a wide area network (WAN), or the connection may be made to an external computing device (for example, through the Internet using an Internet Service Provider).

The client device for carrying out operations for aspects of the present disclosure can be, but is not limited to, a mainframe computer, a server, a desktop computer, a laptop computer, a tablet computer, a smart phone, a "thin" client such as a dumb terminal or a handheld digital device.

Aspects of the present disclosure are described below with reference to flowchart illustrations and/or block diagrams of methods, systems and computer application applications according to embodiments of the disclosure. Each block of the flowchart illustrations and/or block diagrams, and combinations of blocks in the flowchart illustrations and/or block diagrams, can be implemented by computer application instructions. These computer application instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer application instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer application instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer application applications according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements that fall within the scope of the claims which follow. These claims should be construed to maintain the proper protection for the disclosure first described.

It is understood that when an element is referred hereinabove as being "on" another element, it can be directly on the other element or intervening elements may be present therebetween. In contrast, when an element is referred to as being "directly on" another element, there are no intervening elements present.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures.

In conclusion, herein is presented a system for customizing keepsake clothing that memorializes an event or an association by electronically collecting messages and signatures from a plurality of invitees to be arranged and printed as an individualized graphic design on an article of clothing as a keepsake souvenir of the event or association. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method performed by one or more processing devices, comprising:
    responding to the presentation of a fantasy sport team roster by presenting a plurality of digital player signature strings in a roster array in RAM (random access memory) of a first processing device;
    arranging in RAM the digital signature strings within an electronic template in response to a user input via a graphic user interface (GUI);
    transferring the electronic template with the digital signature strings to a printer microprocessor in response to a command in the first processing device; and
    converting the electronic template with the digital signature strings to a physical display by printing onto a garment in response to a further command in the printer microprocessor.

2. The method as described in claim 1, wherein in response to a player input of a signature in RAM of a second processing device, said signature string is stored as a digital signature string in memory in a database storage in the first processing device.

3. The method as described in claim 2, wherein the player input of the signature in RAM of the second processing device is presented through a pointing processing device associated with the second processing device.

4. The method as described in claim 3, wherein the second processing device is in communication through a network with the first processing device, operative for transferring a copy of the digital player signature string to the first processing device for storage in a database until the roster is presented in RAM.

5. The method as described in claim 4, wherein the fantasy sport team roster is created in an array in RAM in a third processing device that is in communication through a network with the first processing device.

6. The method described in claim 5, wherein in response to the presentation of digital player signature strings in RAM selected in response to said roster array, creating an array of player and associated royalty rates stored in a database storage for an accounts database.

7. The method described in claim 6, wherein the first processing device presents a frequency array of frequency of player signatures and royalty rates strings in response to a request for a license fee calculation.

8. The method described in claim 7, wherein the step of presenting a frequency array of digital player signature strings in response to a request for a license fee calculation is followed by the step of:
    obtaining the royalty rate of each player whose signature is stored as a digital signature string;
    calculating in RAM the licensing fee for each player based on a frequency in the frequency table and said royalty rate of each player; and
    in response to said calculation, communicating to a further processing device at a financial institution authorizing funds to transfer to each player's account.

9. The method as described in claim 8, wherein the roster contains a defense squad having a defense squad logo.

10. The method as described in claim 9, wherein responding to the presentation of a sport team roster by presenting the defense squad logo and a plurality of digital player signature strings and the defense squad logo in RAM of a first processing device is followed by:
- arranging in RAM the defense squad logo and the digital signature strings within an electronic template in response to a user input via a (GUI);
- transferring the electronic template with the digital signature strings to a printer microprocessor in response to a command in the first processing device; and
- converting the electronic template with the digital signature strings and logo to a physical display by printing onto a garment in response to a further command in the printer microprocessor.

11. A method performed by one or more processing devices, comprising:
- responding to the presentation of a fantasy football sport team roster by presenting a plurality of digital player signature strings and a digitized defense squad logo in a roster array in RAM (random access memory) of a first processing device;
- arranging in RAM the digital signature strings and the digitized defense squad logo within an electronic template in response to a user input via a graphical user interface (GUI);
- transferring the electronic template with the digital signature strings and the digitized defense squad logo to a printer microprocessor in response to a command in the first processing device; and
- converting the electronic template with the digital signature strings and digitized defense squad logo to a physical display by printing onto a garment in response to a further command in the printer microprocessor.

12. The method as described in claim 11, wherein in response to a player input of a signature in RAM of a second processing device, said signature is stored as a digital signature string in memory in a database in the first processing device.

13. The method as described in claim 12, wherein the player input of the signature in RAM of the second processing device is presented through a pointing device associated with the second processing device.

14. The method as described in claim 13, wherein the second processing device is in communication through a network with the first processing device, operative for transferring a copy of the digital player signature string to the first processing device for storage in a database storage until a roster is presented in RAM.

15. The method as described in claim 14, wherein the fantasy sport team roster is created in an array in RAM in a third processing device that is in communication through a network with the first processing device.

16. The method described in claim 15, wherein in response to the presentation of the digital player signature strings and the digitized defense squad logo in RAM selected in response to said roster, directing an accounting module to identify a plurality of players of said selected digital player signature strings.

17. The method described in claim 16, wherein the accounting module presents a frequency array of the digital player signature strings and the defense squad logo in response to a request for a license fee calculation.

18. The method described in claim 17, wherein the step of presenting a frequency array of digital player signature strings and defense squad logo in response to a request for a license fee calculation is followed by the step of:
- obtaining the royalty rate of each player and each defense squad logo whose signature is stored as a digital signature string;
- calculating the licensing fee for each player and the defense squad logo based on a frequency in the frequency table and said royalty rate of each player; and
- in response to said calculation, communicating to a further processing device at a financial institution that funds are to be transferred to each player's and defense squad account.

* * * * *